US012569780B2

(12) United States Patent
Perservati

(10) Patent No.: US 12,569,780 B2
(45) Date of Patent: Mar. 10, 2026

(54) FRESNEL SPOT LENS DESALINIZATION SYSTEM AND METHOD

(71) Applicant: Nicholas Shea Perservati, Huntington, WV (US)

(72) Inventor: Nicholas Shea Perservati, Huntington, WV (US)

( * ) Notice: Subject to any disclaimer, the term of this patent is extended or adjusted under 35 U.S.C. 154(b) by 77 days.

(21) Appl. No.: 18/449,365

(22) Filed: Aug. 14, 2023

(65) Prior Publication Data
US 2024/0050872 A1      Feb. 15, 2024

Related U.S. Application Data

(60) Provisional application No. 63/397,822, filed on Aug. 13, 2022.

(51) Int. Cl.
| | |
|---|---|
| *C02F 1/14* | (2023.01) |
| *B01D 1/00* | (2006.01) |
| *B01D 5/00* | (2006.01) |
| *C02F 1/04* | (2023.01) |
| *F24S 20/20* | (2018.01) |
| *F24S 23/30* | (2018.01) |
| *C02F 103/08* | (2006.01) |
| *F24S 70/12* | (2018.01) |

(52) U.S. Cl.
CPC ......... *B01D 1/0035* (2013.01); *B01D 1/0064* (2013.01); *B01D 5/006* (2013.01); *B01D 5/0081* (2013.01); *B01D 5/009* (2013.01); *C02F 1/043* (2013.01); *C02F 1/14* (2013.01);

*F24S 20/20* (2018.05); *F24S 23/31* (2018.05); *C02F 2103/08* (2013.01); *C02F 2201/005* (2013.01); *F24S 70/12* (2018.05)

(58) Field of Classification Search
CPC .... B01D 1/0035; B01D 1/0064; B01D 5/006; B01D 5/0081; B01D 5/009; C02F 1/043; C02F 1/14; F24S 20/20; F24S 23/31
See application file for complete search history.

(56) References Cited

U.S. PATENT DOCUMENTS

| | | | | |
|---|---|---|---|---|
| 3,357,898 A | * | 12/1967 | Novakovich | ........... F24S 20/70 |
| | | | | 202/83 |
| 3,775,257 A | * | 11/1973 | Lovrich | .................... C02F 1/14 |
| | | | | 202/202 |
| 4,134,393 A | * | 1/1979 | Stark | ......................... C02F 1/14 |
| | | | | 126/714 |

(Continued)

*Primary Examiner* — Jonathan Miller

(74) *Attorney, Agent, or Firm* — Spilman, Thomas & Battle, LLC; Sophia L. Hines; Shane P. Riley

(57) ABSTRACT

A Fresnel spot lens desalinization system includes a Fresnel spot lens (FSL) disposed above a heating element. The heating element has a collector plate and a rod portion; The FSL concentrates solar energy onto the collector plate. A condenser vessel is connected to the collector plate. The rod portion extends into the condenser vessel having a heat resistant exterior shell. The rod portion projects interiorly of the condenser vessel at a downward angle and includes a top portion that is connected to a flat head of the heating element. The flat head receives the solar energy generated from FSL The concentrated solar energy increases the temperature of the heating element inside the condenser vessel to vaporize the salt water to steam and transfer the steam into a condensing tube to condense the steam into pure water.

20 Claims, 2 Drawing Sheets

FRESNEL SPOT LENS DESALINIZATION

(56)                    References Cited

U.S. PATENT DOCUMENTS

| | | | | |
|---|---|---|---|---|
| 4,194,949 | A * | 3/1980 | Stark | F24S 23/30<br>202/180 |
| 4,210,121 | A * | 7/1980 | Stark | F24S 23/31<br>136/246 |
| 4,249,516 | A * | 2/1981 | Stark | F24S 23/12<br>136/246 |
| 4,270,981 | A * | 6/1981 | Stark | C02F 1/14<br>202/180 |
| 8,882,968 | B1 * | 11/2014 | Griggs | B01D 1/0035<br>203/10 |
| 8,951,391 | B2 * | 2/2015 | McClure | B01D 1/06<br>159/DIG. 42 |
| 10,233,095 | B1 * | 3/2019 | Haidar | H10F 77/484 |
| 10,384,165 | B1 * | 8/2019 | Haidar | B01D 61/3641 |
| 10,590,011 | B2 * | 3/2020 | Alkhazraji | B01D 1/0088 |
| 2011/0203915 | A1 * | 8/2011 | McClure | B01D 1/0082<br>203/3 |
| 2014/0231327 | A1 * | 8/2014 | D'Alba | B01D 5/0066<br>210/175 |

* cited by examiner

FRESNEL SPOT LENS DESALINIZATION

FRESNEL SPOT LENS DESALINIZATION SYSTEM AND METHOD

CROSS-REFERENCE TO RELATED APPLICATIONS

This patent application claims the benefit of U.S. Provisional Patent Application Ser. No. 63/397,822 filed Aug. 13, 2022, entitled "Fresnel Spot Lens Desalinization System and Method," which is hereby incorporated by reference.

COPYRIGHT NOTICE

BACKGROUND

The application generally relates to methods and systems for desalinization of salt water, the application relates more specifically to a method and system for desalinization of salt water using a Fresnel spot lens to condense fresh drinking water from salt water.

Desalinization is a costly process that typically requires significant amounts of energy to boil the water into steam. There are new and complex technologies that attempt to provide large volumes of drinking water using computers and electrified components. Other technologies attempt to boil water using magnification from Fresnel lens focused directly on the water source. Heating a large volume of water to the boiling point requires a tremendous amount of energy and time. The disclosed method does not involve boiling a large volume of water and the associated energy and time that is required.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a Fresnel spot lens desalinization system. The Fresnel spot lens desalinization system includes a Fresnel spot lens (FSL) disposed above a heating element. The heating element has a collector plate and a rod portion; The FSL is disposed to receive solar rays and concentrate solar energy onto the collector plate. The collector plate is in thermal communication with the rod portion. A condenser vessel is connected to the collector plate via an input conduit. The rod portion extends into the condenser vessel having a heat resistant exterior shell. The rod portion projects interiorly of the condenser vessel at a downward angle and includes a top portion that is connected to a flat head of the heating element. The flat head receives the solar energy generated from FSL The concentrated solar energy increases the temperature of the heating element inside the condenser vessel to vaporize the salt water to steam and transfer the steam into a condensing tube to condense the steam into pure water.

Another embodiment relates to a method for desalinization using a Fresnel spot lens to focus heat of vaporization onto a heating element. The method includes providing a FSL; receiving by the FSL solar radiation; focusing the solar radiation on a head portion of a heating element; transmitting heat from the head portion to a condenser vessel via a rod portion in thermal communication with the head portion; controllably releasing a flow of salt water into the condenser vessel to vaporize the salt water from the heat transmitted from the rod portion; capturing the steam from the vaporized salt water via a tubing section; condensing the steam to purified water in the tubing section; and discharging the fresh water from the tubing section into a collection tank.

The disclosed systems and methods provide individuals with the ability to supply own drinking water safely and cost effectively from ocean water or other natural water sources.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
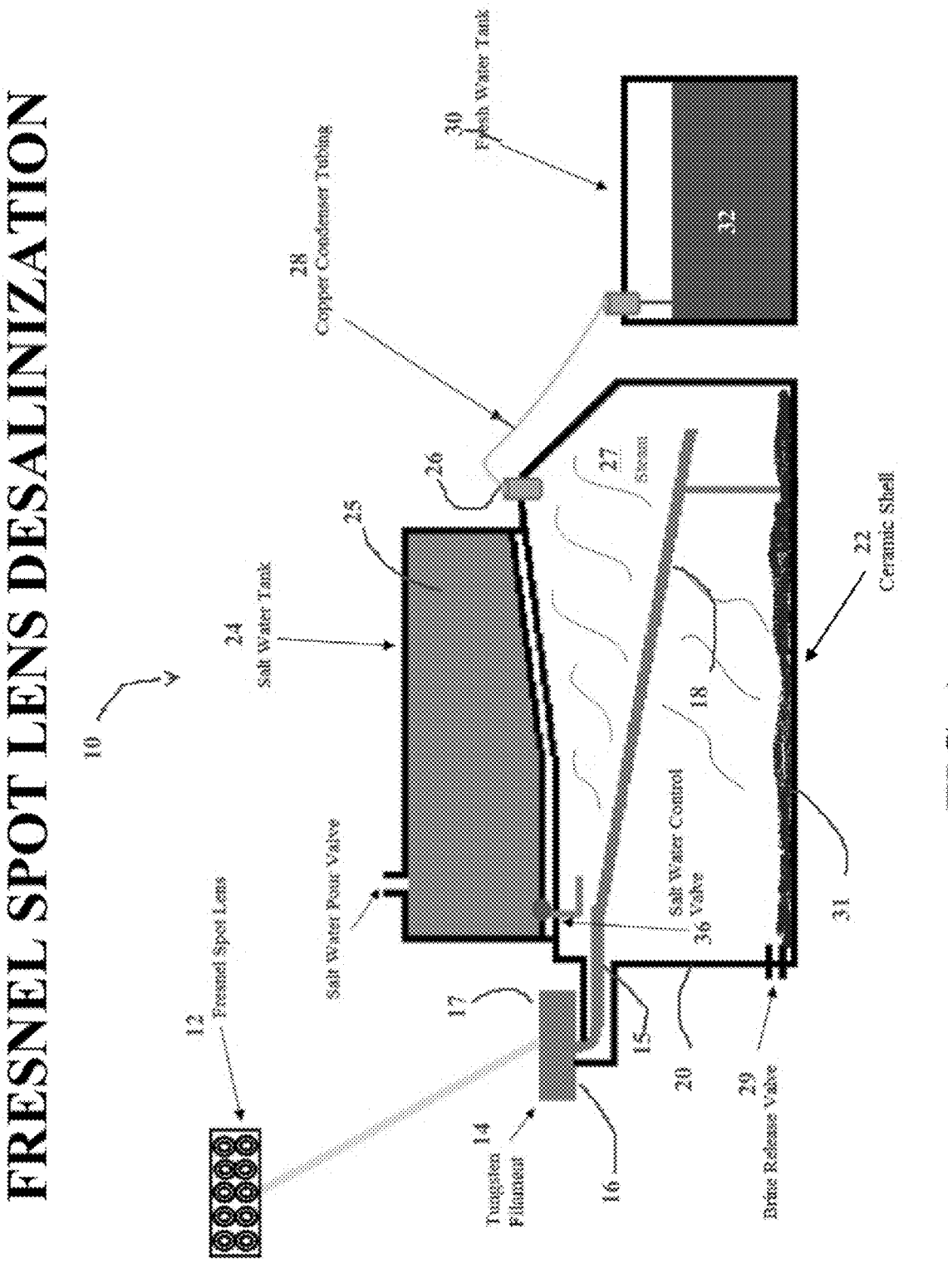
FIG. 1 shows a schematic diagram of an exemplary Fresnel spot lens desalinization system.

Referring to FIG. 1, a Fresnel spot lens desalinization system 10 includes a Fresnel spot lens (FSL) 12. FSL 12 is disposed above a heating element 14. Heating element 14 includes a collector plate 16 and a rod portion 18. FSL 12 receives solar rays impinging on FSL 12 and concentrates solar energy onto collector plate 16. Collector plate 16 is in thermal communication with rod portion 18. Collector plate 16 is mounted to an input conduit of a condenser vessel 20, with rod portion 18 extending into condenser vessel 20. Condenser vessel 20 may be constructed in various shapes, e.g., a bowl or a box. Vessel 20 is preferably compact and portable. Condenser vessel 20 has a heat resistant exterior shell 22. In an embodiment exterior shell 22 may be a ceramic coating that allows condenser vessel 20 to be transported immediately after use without the risk of burns. In other embodiments the exterior shell may be refractory coating or other thermally insulating coating for high temperature applications.

Condenser vessel 20 includes a tungsten or stainless steel rod portion 18 projecting interiorly at a downward angle. The top portion 15 of rod portion 18 exits condenser vessel 20 and connects with a flat head 17 that receives the heat generated from FSL 12. Tungsten or stainless steel is the preferred material for heating element 14 due to their properties to resist extreme heat, anti-corrosive properties, and thermal conductivity. Materials having similar thermal resistance, conductivity and anti-corrosive properties may be used to construct heating element 14. Head 17 may be manually or automatically positioned to focus sunlight onto head 17 of heating element 14, thereby increasing the temperature of the heating element 14 inside condenser vessel 20 to temperatures in excess of 400 degrees Fahrenheit (° F.), or 204.4 degrees Centigrade (° C.). Heating element 14 may reach temperatures up to 700° F., or 371° C. In an embodiment rod portion 18 may include baffles or ridges 19 to increase the surface area of rod portion for increased thermal transmission for vaporizing salt water.

After the heating element 14 is heated by FSL 12, e.g., about 30-60 seconds, a salt water control valve 36 is opened. Salt water control valve 36 connects a salt water reservoir or tank 24 to the condenser vessel 20 when placed in an open position. Opening valve 36 provides a continuous controlled stream of salt water 25 to impinge upon the heated rod portion 18, causing the salt water 25 to vaporize. The steam vapor 27 rises to the top of condenser vessel 20 and flows through an aperture 26 in flow communication with a copper condenser tube 28. Condenser tube 28 is connected in flow communication between condenser vessel 20 and a fresh water reservoir 30. As the vaporized salt water cools while flowing in the condenser tube 28, the vapor condenses into purified water without salt or other impurities. The purified water 32 flows into fresh water tank 30, where it is collected and stored for drinking and cooking.

Figure 2:
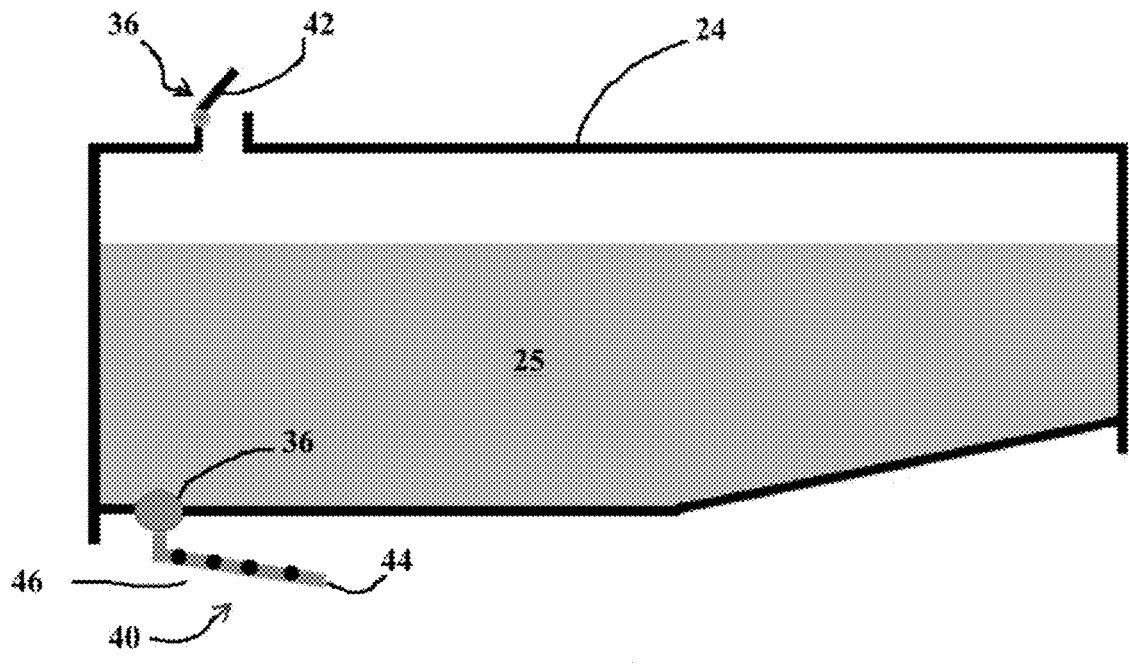
FIG. 2 shows an exemplary embodiment of a specially designed distributor trough for distributing salt water over the heating element.

Referring next to FIG. 2, the salt water may be controllably released onto the heating element 20 using a specially designed distributor trough 40. Trough 40 provides a continuous stream of salt water 25 to be vaporized without cooling the temperature of heating element 14. A spring loaded flap or valve 21 may be provided on top of reservoir 24 to add salt water for desalinization. Valve 36 disposed on the bottom of reservoir 24 opens to allow salt water to flow from reservoir 24 onto heating element from sprinkler head 44 on distribution trough 40. Sprinkler head 44 includes apertures 46. The width of sprinkler head 44 and the number and size of apertures may vary based on the maximum volume of salt water designed to flow onto heating element 18 without causing heating element 18 to lower the internal temperature so as to prevent vaporization.

The size of the FSL 12 may be specifically designed to provide an optimal amount of magnified sunlight to the heating element 14 to prevent overheating heating element 14 while maintaining a sufficiently high temperature to vaporize the salt water. Heating element 14 may be designed to maximize surface contact with the water in order to maximize the amount of water vapor. In one embodiment heating element 14 may be elevated so that runoff water from the heating element 14 will collect in the bottom of the bowl and later drained by opening a brine release valve 29 disposed adjacent the bottom of condenser vessel 20, where briny precipitate 31 collects. The salt water can be poured into reservoir 24 which automatically feeds into condenser vessel 20 when valve 36 is opened.

Also disclosed is a method of desalinization of salt water, or sea water. The method includes providing a FSL 12; receiving by the FSL 12 solar radiation; focusing the solar radiation on a head portion of a heating element; transmitting heat from the head portion to a condenser vessel via a rod portion in thermal communication with the head portion; controllably releasing a flow of salt water into the condenser vessel to vaporize the salt water from the heat transmitted from the rod portion; capturing the steam from the vaporized salt water via a tubing section; condensing the steam to purified water in the tubing section; and discharging the fresh water from the tubing section into a collection tank.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the Fresnel spot lens desalinization system and methods as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

I claim:

1. A Fresnel spot lens desalinization system for desalinizing salt water comprising:

a Fresnel spot lens (FSL) disposed above a heating element; the heating element having a collector plate and a solid rod portion;

the FSL disposed to receive solar rays and concentrate solar energy onto the collector plate; wherein the collector plate is in direct thermal communication with the solid rod portion and the FSL;

a condenser vessel connected to the collector plate via an input conduit; the solid rod portion extending into said condenser vessel wherein the condenser vessel comprises a heat resistant exterior shell;

the solid rod portion projecting interiorly of said condenser vessel at a downward angle and wherein the solid rod portion comprises a top portion connected to a flat head; the flat head receiving the solar energy generated from said FSL;

wherein the concentrated solar energy increases the temperature of the heating element inside the condenser vessel to vaporize the salt water to steam and transfer the steam into a condensing tube to condense the steam into pure water.

2. The Fresnel spot lens desalinization system of claim 1, wherein the said condenser vessel is constructed in a compact and portable shape.

3. The Fresnel spot lens desalinization system of claim 1, wherein the said condenser vessel comprises a heat resistant exterior shell.

4. The Fresnel spot lens desalinization system of claim 3, wherein the heat resistant exterior shell consists of a ceramic coating.

5. The Fresnel spot lens desalinization system of claim 3, wherein the heat resistant exterior shell consists of a thermally insulating coating.

6. The Fresnel spot lens desalinization system of claim 5, wherein the thermally insulating coating is a refractory coating.

7. The Fresnel spot lens desalinization system of claim 1, wherein the solid rod portion of the heating element is made from a material selected from the group consisting of tungsten and stainless steel.

8. The Fresnel spot lens desalinization system of claim 1, wherein the solid rod portion of the heating element has a non-smooth surface.

9. The Fresnel spot lens desalinization system of claim 8, wherein said non-smooth surface is selected from a group consisting of pebbled, pyramidal, baffled, or ridged.

10. The Fresnel spot lens desalinization system of claim 1, further comprising: a reservoir for containing salt water having a top valve and a bottom valve; a distributer trough connected to said reservoir bottom valve protruding from the reservoir into the condenser vessel above the heating element; and a sprinkler head having multiple apertures connected to the protruding end of the distributor trough to allow for a controlled flow of salt water from the reservoir to the heating element.

11. The Fresnel spot lens desalinization system of claim 10 wherein the width of the sprinkler head and number of apertures are optimized to maximize the flow of salt water to the heating element without causing the heating element to lower the internal temperature so as to prevent vaporization.

12. The Fresnel spot lens desalinization system of claim 1 wherein the FSL size is optimized to provide an amount of magnified sunlight to the heating element to allow for vaporization without overheating the heating element to failure.

13. The Fresnel spot lens desalinization system of claim 1 wherein the heating element is elevated within the condenser vessel to allow runoff water from said heating element to collect on the bottom of the condenser vessel.

14. The Fresnel spot lens desalinization system of claim 13 further comprising a brine release valve on the bottom portion of the condenser vessel.

15. The Fresnel spot lens desalinization system of claim 1 further comprising a collection tank connected to the condensing tube to collect purified water from said condensing tube.

16. The Fresnel spot lens desalinization system of claim 1 wherein the condensing tube is made of copper.

17. A method of desalinization of salt water comprising:

providing a Fresnel spot lens (FSL) and receiving by the FSL solar radiation;

focusing said solar radiation on a head portion of a heating element, wherein said FSL is in direct thermal communication with the heating element via the head portion;

transmitting heat from said head portion to a condenser vessel via a solid rod portion in thermal communication with said head portion;

controllably releasing a flow of salt water into said condenser vessel to vaporize the salt water from heat transmitted from said solid rod portion;

capturing the steam from the vaporized salt water via a tubing section;

condensing the steam into purified water in said tubing section; and discharging the purified water from said tubing section into a collection tank.

18. The method of claim 17 wherein the head portion of the heating element is automatically positioned to focus sunlight onto said head portion of the heating element and adjust the temperature inside the condenser vessel.

19. The method of claim 17 wherein the head portion of the heating element is manually positioned to focus sunlight onto said head portion of the heating element and adjust the temperature inside the condenser vessel.

20. The method of claim 17 wherein the heating element is heated to a temperature between 400 and 700 degrees Fahrenheit, or 204.4 and 371 degrees Centigrade.

* * * * *